UNITED STATES PATENT OFFICE.

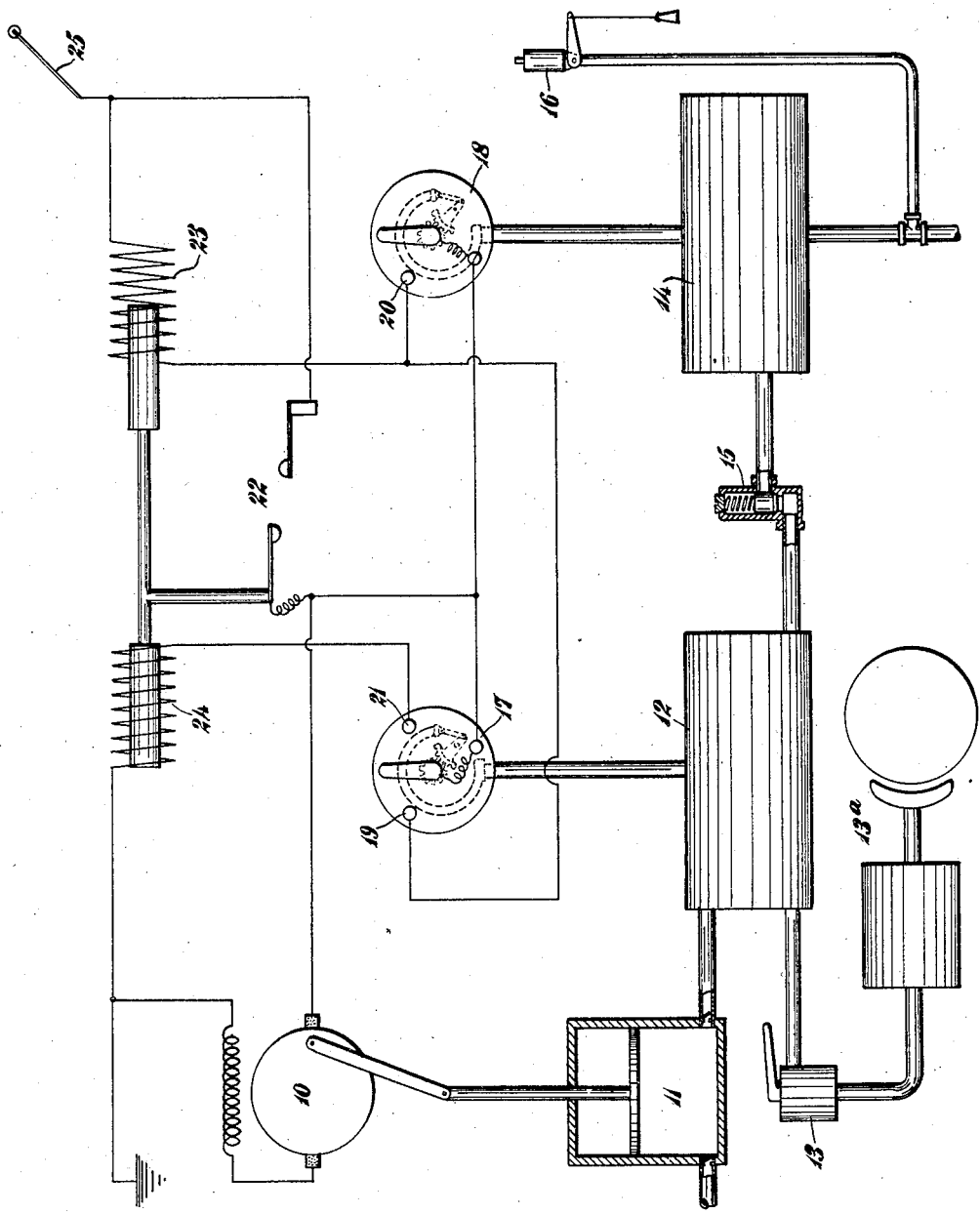
W. F. SCHNEIDER.
FLUID PRESSURE SYSTEM.
APPLICATION FILED APR. 29, 1907.
903,892.
Patented Nov. 17. 1908.

WILLIAM F. SCHNEIDER, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

FLUID-PRESSURE SYSTEM.

No. 903,892.　　　Specification of Letters Patent.　　　Patented Nov. 17, 1908.

Application filed April 29, 1907. Serial No. 370,949.

*To all whom it may concern:*

Be it known that I, WILLIAM F. SCHNEIDER, citizen of the United States, residing at Norwood, in the county of Hamilton and State of Ohio, have invented certain new and useful Improvements in Fluid-Pressure Systems, of which the following is a full, clear, and exact specification.

My invention relates to fluid pressure systems, particularly as applied for the operation of brakes and auxiliary apparatus by compressed air.

On cars or trains equipped with air brake systems, air for operating certain auxiliary apparatus such as whistles, sanders, etc., is often drawn from the same reservoir which supplies the brake system. If the brakes are operated on the straight air system, the blowing of the whistle or the application of sand when the pressure in the reservoir is down nearly to the minimum for which the operating mechanism of the supply pump is set, often drains the air from the reservoir until the pressure is brought much lower than the desired minimum before the pump has time to operate. Should it be attempted to apply the brakes at this time the pressure in the reservoir is often insufficient to do so or so weak that the brake acts slowly and ineffectively. If a plurality of cars are used the conditions are still worse because of the greater amount of air required for the additional brakes. On the other hand, if the brakes are operated on the automatic system, the blowing of the whistle or the application of sand often reduces the pressure sufficiently to cause an undesired application of the brakes.

It is the object of my present invention to provide a system applicable to both straight and automatic air brake systems and in which the use of air for auxiliary apparatus is not attended by these objections; in other words, to make the action of the air brakes entirely independent of the operation of any auxiliary fluid pressure operated apparatus.

With these objects in view, my invention comprises the combination of two reservoirs connected to independent sets of fluid pressure operated apparatus, means for connecting said two reservoirs when the pressure in one of them exceeds a predetermined value, and a pump for supplying fluid pressure to that reservoir. This pump is preferably controlled in response to variations of pressure in both reservoirs.

Other features of my invention will appear from the description and drawings and will be particularly pointed out in the claims.

The single figure of the drawings shows diagrammatically one embodiment of my invention.

An electric motor 10, here shown as series-wound, is arranged to drive an air compressor or other fluid pump 11. The compressor 11 supplies air directly to a reservoir 12 from which air may be drawn through an engineer's valve 13 to supply an air-brake system 13ᵃ of any desired type, straight or automatic, though here shown as a straight air system. A second reservoir 14 is supplied from the reservoir 12 through an adjustable pop valve 15 arranged to open to connect the two reservoirs when the pressure in the reservoir 12 exceeds a predetermined value, say 75 lbs. Air may be drawn from the reservoir 14 to supply the whistle 16, the sander, and other auxiliary apparatus.

Two Bourdon gages 17 and 18 are connected to the reservoirs 12 and 14 respectively, the fingers of these gages engaging the stationary contacts 19 and 20 respectively when the pressures in their associated reservoirs fall to their respective minima, say 60 and 40 lbs., and the finger of the gage 17 engaging the stationary contact 21 when the pressure in the reservoir 12 reaches a predetermined maximum, say 80 lbs., slightly greater than the value at which the valve 15 opens. The circuit of the motor 10 is controlled by a magnetically operated switch 22, which may be connected to operate in any desired manner. As here shown the switch-closing magnet 23 is energized when the pressure in either reservoir 12 or 14 reaches its minimum and the switch-opening magnet 24 when the pressure in the reservoir 12 reaches its maximum. The magnets 23 and 24 are deënergized as soon as they have operated the switch 22, the former by being short-circuited by the closing of the switch and the latter by having its circuit interrupted by the opening of the switch. Thus there is no sparking at the contacts of the Bourdon gages. However, this feature forms no part of my present invention and any other form of magnetically operated switch may be used to control the motor 10, the particular arrangement shown being merely a desirable one.

Suppose the pressures in the two reservoirs 12 and 14 to be above their respective minima but below the pressure at which the valve 15 is open. Air may now be drawn from the auxiliary reservoir 14 for the operation of the whistle, sander, or other auxiliary apparatus without affecting the pressure in the reservoir 12. Correspondingly, air may be drawn from the reservoir 12 for the operation of the air brake system without affecting the pressure in the reservoir 14. When the pressure in either reservoir reaches its minimum, the finger of the Bourdon gage associated with that reservoir engages the contact 19 or 20, as the case may be, thus completing the circuit of the solenoid 23. This solenoid being energized moves the switch 22 to closed position, in which position it short-circuits the solenoid 23 and the finger of the Bourdon gage which completed the circuit of said solenoid. The motor 10 now operates to supply air to the reservoir 12. When the air in said reservoir reaches the pressure for which the valve 15 is set, said valve opens to connect the two reservoirs to permit air to pass from the reservoir 12 to the reservoir 14. When the pressure in the two reservoirs now reaches the maximum the finger of the Bourdon gage 17 engages the contact 21 to complete the circuit of the solenoid 24, which being thus energized opens the switch 22 to break the circuit of the motor 10 and also its own circuit. As soon as a small amount of air is now drawn from either reservoir the pressure in the two reservoirs falls below the value for which the valve 15 is set and said valve closes to render the pressures in said two reservoirs independent of each other.

As the pressure in either reservoir falls to its minimum, the above described cycle of operations is repeated, maintaining the pressure in the reservoir 12 always between its maximum and minimum, here taken as 80 and 60 lbs. respectively, and the pressure in the reservoir 14 between the same maximum and its own minimum, here taken as 40 lbs.

Many modifications in the precise arrangements here shown and described may be made without departing from the spirit and scope of my invention and all such I aim to cover in the following claims.

What I claim as new is:—

1. In combination, two reservoirs for supplying fluid pressure to main and auxiliary fluid pressure operated apparatus respectively, a pop valve between said two reservoirs arranged to open when the pressure in one of said reservoirs exceeds a predetermined value, and a pump for supplying fluid pressure to the reservoir which supplies the main fluid pressure apparatus.

2. In combination, two reservoirs, each supplying an independent set of fluid operated apparatus, means for connecting said two reservoirs when the pressure in one of them exceeds a predetermined value, and a pump for supplying fluid pressure to that reservoir.

3. In combination, two reservoirs, each supplying an independent set of fluid operated apparatus, and means for connecting said two reservoirs when the pressure in one of them exceeds a predetermined value.

4. In combination, two reservoirs, each supplying an independent set of fluid operated apparatus, means for connecting said two reservoirs when the pressure in one of them exceeds a predetermined value, a pump for supplying fluid pressure to that reservoir, and means for controlling said pump in response to variations of pressure in each reservoir.

5. In combination, two reservoirs, each supplying an independent set of fluid operated apparatus, means for connecting said two reservoirs when the pressure in one of them exceeds a predetermined value, a pump for supplying fluid pressure to that reservoir, and means for controlling said pump in response to variations of pressure in each reservoir.

6. In combination, two reservoirs, each supplying an independent set of fluid operated apparatus, means for connecting said two reservoirs when the pressure in one of them exceeds a predetermined value, and automatic means for maintaining the pressure in each reservoir within predetermined limits.

7. In a fluid pressure system, the combination of two reservoirs, an air-brake system connected to one of said reservoirs, auxiliary pressure operated apparatus connected to the other of said reservoirs, means for connecting said two reservoirs when the pressure in one of them exceeds a predetermined value, and a pump for supplying fluid pressure to one of said reservoirs.

8. In a fluid pressure system, the combination of two reservoirs, an air-brake system connected to one of said reservoirs, auxiliary pressure operated apparatus connected to the other of said reservoirs, and means for connecting said two reservoirs when the pressure in one of them exceeds a predetermined value.

9. In a fluid pressure system, the combination of two reservoirs, an air-brake system connected to one of said reservoirs, auxiliary pressure operated apparatus connected to the other of said reservoirs, means for connecting said two reservoirs when the pressure in one of them exceeds a predetermined value, a pump for supplying fluid pressure to one of said reservoirs, and automatically controlled means for operating said pump.

10. In a fluid pressure system, the combination of two reservoirs, an air-brake system connected to one of said reservoirs, auxiliary pressure operated apparatus connected to the other of said reservoirs, means for connecting said two reservoirs when the pressure in one of them exceeds a predetermined value, a pump for supplying fluid pressure to one of said reservoirs, means for operating said pump, and means for controlling said operating means in response to the variations in the pressures in said two reservoirs.

11. In a fluid pressure system, the combination of two reservoirs, an air-brake system connected to one of said reservoirs, auxiliary pressure operated apparatus connected to the other of said reservoirs, means for connecting said two reservoirs when the pressure in one of them exceeds a predetermined value, a pump for supplying fluid pressure to one of said reservoirs, and automatic means for maintaining the pressure in each reservoir within predetermined limits.

12. In a fluid pressure system, the combination of two reservoirs, an air-brake system connected to one of said reservoirs, auxiliary pressure operated apparatus connected to the other of said reservoirs, means for connecting said two reservoirs when the pressure in one of them exceeds a predetermined value, a pump for supplying fluid pressure to one of said reservoirs, and means for starting said pump when the pressure in either reservoir reaches its respective predetermined minimum and for stopping said pump when the pressure in the reservoir supplied directly by the pump reaches a predetermined maximum.

13. In a fluid pressure system, the combination of a pump, a reservoir supplied thereby, a set of fluid pressure operated apparatus supplied from said reservoir, a second reservoir supplied from the first through a valve which is open only when the pressure in the first exceeds a predetermined value, a set of fluid pressure operated apparatus supplied from said second reservoir, a motor for driving said pump, and means for starting said motor when the pressure in either reservoir reaches its predetermined minimum and for stopping said pump when the pressure in the first reservoir reaches a predetermined maximum.

14. In a fluid pressure system, a reservoir, an air-brake system connected thereto, a second reservoir, auxiliary air pressure operated apparatus connected thereto, and a valve for connecting said reservoirs when the pressure in the first reaches a predetermined value.

15. In a fluid pressure system, a reservoir, an air-brake system connected thereto, a second reservoir, auxiliary air pressure operated apparatus connected thereto, a valve for connecting said reservoirs when the pressure in the first reservoir exceeds a predetermined value, and a motor driven pump supplying said first reservoir and controlled automatically by the pressures in the two reservoirs.

16. In a fluid pressure system, a reservoir, an air-brake system connected thereto, a second reservoir, auxiliary air pressure operated apparatus connected thereto, a valve for connecting said reservoirs when the pressure in one of said reservoirs exceeds a predetermined value, and a motor driven pump controlled automatically by the pressures in the two reservoirs to supply the reservoir the pressure in which controls said valve.

17. In a fluid pressure system, the combination of a main reservoir, an air-brake system connected to said main reservoir, an air compressor supplying said main reservoir to maintain the pressure therein within predetermined limits, an auxiliary reservoir, auxiliary air pressure operated apparatus connected to said auxiliary reservoir, and a pop valve for connecting said reservoirs when the pressure in the main reservoir exceeds a predetermined value.

18. In combination, a main reservoir, an air-brake system directly connected thereto, and auxiliary air pressure operated apparatus supplied from said reservoir through a pop valve and a second reservoir, said pop valve being arranged to be closed except when the pressure in the main reservoir exceeds a predetermined value.

19. In combination, two reservoirs, an air-brake system supplied from one of said reservoirs, auxiliary air pressure operated apparatus supplied from the other reservoir, means for connecting said two reservoirs when the pressure in the first exceeds a predetermined value, and automatic means for maintaining the pressure within said first reservoir within predetermined limits between which is the pressure at which said connecting means operates.

20. In combination, two reservoirs, an air-brake system supplied from one of said reservoirs, auxiliary air pressure operated apparatus supplied from the other reservoir, means for connecting said two reservoirs when the pressure in the first exceeds a predetermined value, and automatic means for maintaining the pressures within both reservoirs within predetermined limits.

21. In a fluid pressure system, the combination of two reservoirs, an air-brake system and auxiliary apparatus supplied from said two reservoirs respectively, means for connecting said two reservoirs when the pressure in the one supplying the air-brake system exceeds a predetermined value, an air compressor for supplying said reservoirs, an electric motor for driving said compressor, and means for operating said motor to maintain the pressure within said brake-supplying reservoir within predetermined limits and for starting said motor when the pressure in the other reservoir reaches a predetermined minimum.

22. In a fluid pressure system, the combination of two reservoirs, two sets of fluid pressure operated apparatus connected to said two reservoirs respectively, and a single means for supplying fluid pressure to said two reservoirs and arranged to be controlled in response to variations in pressure of each.

23. In a fluid pressure system, the combination of two fluid pressure reservoirs, two sets of apparatus operated by fluid pressure and connected to said two reservoirs respectively, a single means for supplying fluid pressure to said reservoirs, and means for controlling said supply means to maintain the pressure within each reservoir within predetermined limits.

In testimony whereof I affix my signature in the presence of two witnesses.

WILLIAM F. SCHNEIDER.

Witnesses:
 GEO. B. SCHLEY,
 FRED J. KINSEY.